United States Patent [19]

Yamamoto et al.

[11] Patent Number: 5,703,151
[45] Date of Patent: Dec. 30, 1997

[54] RUBBER COMPOSITION

[75] Inventors: Keisaku Yamamoto; Kizuku Wakatsuki, both of Ichihara; Hayato Saba, Funabashi, all of Japan

[73] Assignee: Sumitomo Chemical Company, Limited, Osaka, Japan

[21] Appl. No.: 632,798

[22] Filed: Apr. 17, 1996

[30] Foreign Application Priority Data

Apr. 17, 1995 [JP] Japan .................................. 7-091188

[51] Int. Cl.$^6$ ..................................................... C08K 5/24
[52] U.S. Cl. ........................... 524/262; 524/269; 524/377; 524/575
[58] Field of Search ............................ 524/377, 571, 524/575, 262, 269

[56] References Cited

U.S. PATENT DOCUMENTS

| | | | |
|---|---|---|---|
| 3,768,537 | 10/1973 | Hess et al. | 524/571 |
| 3,873,489 | 3/1975 | Thurn et al. | 524/267 |
| 4,192,790 | 3/1980 | McKinstry et al. | 524/571 |
| 4,386,181 | 5/1983 | Kotani et al. | 524/377 |
| 5,091,471 | 2/1992 | Graves et al. | 525/89 |
| 5,409,969 | 4/1995 | Hamada . | |
| 5,496,883 | 3/1996 | Hamada . | |

FOREIGN PATENT DOCUMENTS

03252431 A 11/1991 Japan .

OTHER PUBLICATIONS

Haehl & Montu, 'Influence Des Polyethyleneglycols Sur Le Renforcement Des Elastomeres Par Les Silices Et Les Aluminosilicates', vol. 39, No. 11, pp. 1727–1737 (1962).

*Primary Examiner*—Mark D. Sweet
*Attorney, Agent, or Firm*—Cushman Darby & Cushman IP Group of Pillsbury Madison & Sutro, LLP

[57] ABSTRACT

Provided is a rubber composition obtainable by kneading a mixture at a maximum temperature between about 120° to about 170° C. The mixture includes:

100 parts by weight of a solution polymerized diene rubber;

about 5 to about 100 parts by weight of silica;

about 1 to about 15 parts by weight of a silane coupling agent; and about 1 to about 15 parts by weight of a polyalkylene glycol having a weight average molecular weight of about 200 to about 20,000.

The invention also provides a method for making the rubber composition, a tire tread made from the rubber composition, and a tire made from the rubber composition.

9 Claims, No Drawings

RUBBER COMPOSITION

1. FIELD OF THE INVENTION

The present invention relates to a rubber composition. More precisely, the present invention relates to a rubber composition which has significantly improved wet-skid resistance and rolling resistance in combination with excellent processability when converted into a vulcanized rubber because of the absence of bleeding on the surface.

2. BACKGROUND OF THE INVENTION

Rubber compositions containing silica and a silane coupling agent have been widely used for colored or white rubbers because that they are easily colored, compared with rubber compositions containing carbon black. These types of rubber composition have also been used for tires because, in general, they have a smaller loss in energy in the temperature range of room temperature or more. The rubber compositions containing silica and a silane coupling agent, however, exhibit problems that they have insufficient wet-skid resistance and rolling resistance, in combination with poor processability when converted into vulcanized rubbers.

There is a need for a rubber composition containing silica and a silane coupling agent, which has the combination of properties of:

(1) improved wet-skid resistance, (2) improved rolling resistance, and (3) improved processability when converted into vulcanized rubber.

SUMMARY OF THE INVENTION

An objective of the present invention is to provide an improved rubber composition containing silica and a silane coupling agent which solves the problems of conventional rubber composition containing silica and a silane coupling agent.

As the result of extensive studies for such a rubber composition, the present inventors have found that rubber compositions obtainable by kneading a specific polyalkylene glycol into a solution polymerized diene rubber containing silica and a silane coupling agent at a specific temperature have sufficiently improved wet-skid resistance and rolling resistance when converted into vulcanized rubbers, and are excellent in processability because of the absence of bleeding on surface when converted into vulcanized rubbers.

Accordingly, the present invention provides a rubber composition obtainable by kneading a mixture comprising:

100 parts by weight of a solution polymerized diene rubber (A), about 5 to about 100 parts by weight of silica (B), about 1 to about 15 parts by weight of a silane coupling agent (C); and about 1 to about 15 parts by weight of a polyalkylene glycol (D) having a weight average molecular weight of about 200 to about 20,000, wherein the maximum temperature during kneading is between about 120° and about 170° C.

The present invention also provides a method of making the rubber composition, a tire tread made from the rubber composition, and a tire made from the rubber composition.

DETAILED DESCRIPTION OF THE INVENTION

The present invention is described in more detail by the following.

The component (A) in the present invention is a solution polymerized diene rubber. While the precise structure of the solution polymerized diene rubbers is not particularly limited, the rubbers in general have a Mooney viscosity ($ML_{1+4}$ 125° C.) preferably of about 40 to about 140 and more preferably of about 50 to about 120, from the viewpoint of kneading processability. The component (A) can be obtained by any well-known solution-polymerization method which comprises polymerizing dienes in a solvent such as hydrocarbons and the like using an initiator such as a organolithium compound. Also from the viewpoint of kneading processability, the solution polymerized rubbers are preferably produced in the presence of a coupling agent such as $SiCl_4$, $SnCl_4$ or the like in solution polymerization so that a portion or the whole of the polymers present in the solution polyeriztion contain a branched component. Specific examples of the solution polymerized diene rubber include:

a solution polymerized butadiene rubber (BR), a solution polymerized styrene-butadiene rubber (SBR), a solution polymerized isoprene rubber (IR), and the like.

From the viewpoint of tire use, a solution polymerized butadiene rubber and a solution polymerized styrene-butadiene rubber are preferred and a solution polymerized styrene-butadiene rubber is more preferred. These rubbers may be used independently or in combination thereof.

The component (B) in the present invention is silica. There are various kinds of silica which are different based on the concentration of the surface hydroxyl group, pH and particle properties. While the silica used in the present invention is not limited, a silica having an amount of DBA (dibutylamine) absorption of about 100 to about 400 mmol/kg, BET specific surface area of about 50 to about 300 m²/g, and pH of about 5 to about 12 is preferred.

The amount of the component (B) in the rubber composition of the present invention is about 5 to about 100 parts by weight, preferably about 30 to about 90 parts by weight per 100 parts by weight of the component (A). If the amount of the component (B) is too small, the mechanical strength, such as the tear strength, of the vulcanized rubber may be reduced. When the amount of the component (B) is too much, the kneading processability and mechanical strength of the vulcanized rubber may be reduced.

The component (C) in the present invention is a silane coupling agent. Specific examples of the silane coupling agent include compounds represented by the formulae (1) or (2) shown below. These compounds may be used independently or in combination thereof.

$$[(OR)_3SiC_aH_{2a}]_2S_b \qquad (1)$$

$$(OR)_3SiC_aH_{2a}Z \qquad (2)$$

In the above formulae, R represents a methyl group or an ethyl group. The ethyl group is preferred. "a" represents an integer of 1 to about 6 and preferably an integer of 2 to 5. "b" represents an integer of 1 to about 6 and preferably an integer of 2 to 5. "Z" represents a mercapto group, an epoxy group, a vinyl group or an amino group.

Suitable examples of the compounds represented by the formula (1) include:

bis(trimethoxysilylmethyl) disulfide,
bis(2-trimethoxysilylethyl) disulfide,
bis(2-trimethoxysilylethyl) tetrasulfide,
bis(2-trimethoxysilylethyl) pentasulfide,
bis(2-trimethoxysilylethyl) hexasulfide,
bis(3-trimethoxysilylpropyl) disulfide, bis(3-trimethoxysilylpropyl) trisulfide,
bis(3-trimethoxysilylpropyl) tetrasulfide,
bis(3-trimethoxysilylpropyl) pentasulfide,
bis(3-trimethoxysilylpropyl) hexasulfide,
bis(4-trimethoxysilylbutyl) tetrasulfide,
compounds in which the methoxy group in the above listed compounds is replaced by an ethoxy group, and the like.

Suitable examples of the compounds represented by the formula (2) include:
1-mercapto-2-trimethoxysilylethane,
1-mercapto-3-trimethoxysilylpropane,
1-mercapto-4-trimethoxysilylbutane,
1,2-epoxy-3-trimethoxysilylpropane,
1,2-epoxy-4-trimethoxysilylbutane,
3-trimethoxysilyl-1-propene,
4-trimethoxysilyl-1-butene,
1-dimethylamino-2-trimethoxysilylethane,
1-dimethylamino-3-trimethoxysilylpropane,
1-dimethylamino-4-trimethoxysilylbutane,
compounds in which the methoxy group in the above listed compounds is replaced by an ethoxy group, and the like.

Among the compounds represented by the formulae (1) or (2), bis(3-triethoxysilylpropyl) trisulfide, bis(3-triethoxysilylpropyl) tetrasulfide, and bis(3-triethoxysilylpropyl) pentasulfide are preferred.

The amount of the component (C) in the rubber composition of the present invention is about 1 to about 15 parts by weight, preferably about 2 to about 10 parts by weight per 100 parts by weight of the component (A). If the amount of the component (C) is too small, the vulcanization velocity and the mechanical strength of the vulcanized rubber may be reduced. When the amount is too much, the mechanical strength may be reduced and the production cost may be increased. When two or more of the compounds are used as the component (C), the amount of component (C) is considered to be the total amount of all the compounds used as the component (C).

The component (D) in the present invention is a polyalkylene glycol having a weight average molecular weight of about 200 to about 20,000. The weight average molecular weight of the component (D) is preferably about 250 to about 10,000 and more preferably about 300 to about 8,000. Specific examples of suitable polyalkylene glycols include:
polyethylene glycol,
polypropylene glycol,
an ethylene oxide-propylene oxide random copolymer,
an ethylene oxide-propylene oxide block copolymer,
and the like. If the weight average molecular weight of the component (D) is too small, adhesion failure due to bleed may occur on the surface of the vulcanized rubber. When the molecular weight is too large, the wet-skid resistance and rolling resistance may be insufficient and blooming may occur on the surface of the vulcanized rubber.

The amount of the component (D) in the rubber composition of the present invention is about 1 to about 15 parts by weight, preferably about 1 to about 12 parts by weight per 100 parts by weight of the component (A). If the amount of the component (D) is too small, the effects of improved wet-skid resistance or rolling resistance may be reduced. When the amount is too much, the mechanical strength or abrasion resistance may be reduced and bleeding on the surface of the vulcanized rubber may occur. Bleeding on the surface of the vulcanized rubber can result in adhesion failure between the vulcanized rubber comprising the composition of the present invention and another material.

The rubber composition of the present invention can be obtained by kneading the predetermined amounts of the components (A)–(D) as described above under conditions in which the maximum temperature during the kneading is between about 120° and about 170° C. If the temperature is too low, the mechanical strength of the vulcanized rubber may be reduced. When the temperature is too high, deterioration of the vulcanized rubber may occur. The minimum temperature during the kneading should be at least about 0° C., preferably at least about 20° C. If the minimum temperature is too low, molecular chain scission of component (A) in the first stage of the kneading may occur and the economical efficiency may be reduced because the kneading time until the maximum temperature becomes long. The kneading may be performed by using a conventional kneading machine, such as rolls, a Banbury mixer, or the like, until the components are uniformly mixed. In kneading, a common general rubber such as a natural rubber, an emulsion polymerized butadiene rubber, an emulsion polymerized styrene-butadiene rubber, and the like, carbon black, an antioxidant, a processing aid, stearic acid, a reinforcing agent, a filler, a plasticizer, a softening agent and the like may be added in addition to the components (A)–(D).

When the above general rubber, other than the component (A), is added to the rubber composition of the present invention, the weight ratio of the general rubber to the component (A) is preferably about 0.6:1 or less and more preferably about 0.45:1 or less. If the weight ratio of the general rubber is too large, the effects of improved wet-skid resistance and rolling resistance may be reduced.

When carbon black is added to the rubber composition of the present invention, it is preferred to use carbon black having an iodine adsorption of about 60 mg/g or more and a dibutyl phthalate oil absorption of about 80 ml/100 g or more. The carbon black, for example, can be used in an amount preferably of about 100 parts by weight or less, and more preferably of about 60 parts by weight or less, per 100 parts by weight of the component (A).

The unvulcanized rubber obtainable by kneading the rubber composition of the present invention can be converted into a vulcanized rubber by vulcanizing preferably at about 100 to about 250° C. and more preferably at about 130° to about 200° C.

As the vulcanization agent, commonly used sulfur and peroxides can be used, and sulfur is preferred. The vulcanization agent can be used in an amount preferably of about 0.1 to about 5 parts by weight and more preferably of about 0.5 to about 3 parts by weight per 100 parts by weight of the component (A).

Preferred vulcanization accelerators are of guanidine type, sulfenamide type, thiazole type and the like. These can be used independently but preferably in combination of two or more.

The rubber composition of the present invention is preferably used for tires and most suitably for tire treads making use of characteristics that the vulcanized rubber produced from this rubber composition has a high wet-skid resistance and a low rolling resistance and is excellent in processability because of absence of bleed on the surface.

Processes for producing tires including tire treads containing a vulcanized rubber obtained by vulcanizing the rubber composition of the present invention include a method in which an unvulcanized rubber containing the rubber composition of the present invention is molded into a sheet with a commonly used kneading machine such as rolls, kneader or the like and said sheet is pasted on a tire base, placed in a mold having a tread pattern and is vulcanization-molded by heating. The temperature for vulcanization-molding is preferably about 100° to about 250° C. and more preferably about 130° to about 200° C.

The complete disclosure of the priority document, Japanese patent application number 07-91188 (filed Apr. 17, 1995), is incorporated herein by reference.

EXAMPLES

The present invention will now be illustrated in further detail by means of Examples which, however, should not be construed as a limitation upon the scope of the invention.

Examples 1–8 and Comparative Examples 1–7

Into a 20 L SUS reactor substituted by nitrogen gas were charged 15 L of n-hexane, 195 g of tetrahydrofuran, 1420 g of 1,3-butadiene, 580 g of styrene and 8.7 mmol of n-butyllithium, which were reacted at a temperature of 65° C. for 4 hours. After adding 1.3 mmol of tetrachlorosilane, the mixture was further reacted for 30 minutes. Then, 10 ml of methanol and 10 g of Sumilizer BHT were added and dried by vacuum to obtain about 2200 g of solution polymerized SBR (A1).

Into a 1,500 ml Banbury mixer adjusted to 110° C., were concurrently charged the ingredients shown in Table 1, 50 parts by weight of X-140 (an oil manufactured by Kyodo Sekiyu) and 6.4 parts by weight of Diablack N339 (HAF carbon black manufactured by Mitsubishi Chemicals), which were kneaded at a revolution number of rotor of 150 rpm for 5 minutes. After adding 1.5 part by weight of Sunknock N (an antioxidant manufactured by Outi Shinko Kagaku), 1.5 part by weight of Antigen 3C (an antioxidant manufactured by Siumitomo Chemical Co., Ltd.), 2 parts by weight of zinc oxide and 2 parts by weight of stearic acid as the common combination, the kneading was continued using an 8 inch open roll adjusted to 85° C. Then, 1 part by weight of Sox CZ (a vulcanizing accelerator manufactured by Sumitomo Chemical Co., Ltd.), 1 part by weight of Sox D (a vulcanizing accelerator manufactured by Sumitomo Chemical Co., Ltd.) and 1.4 part by weight of sulfur were added and the kneading was further continued using an 8 inch open roll adjusted to 40° C. to give a unvulcanized compound. Said compound was subjected to press vulcanization at 160° C. for 30 minutes to give a vulcanized rubber.

The vulcanized rubber was evaluated by the methods described below. The results are shown in Table 1 and Table 2.

Comparative Example 8

The procedure in Example 2 was substantially repeated except that the maximum temperature during the kneading was 180° C. The obtained composition was gelled and it was impossible to evaluate the obtained composition.

Method of Evaluation (1) Tear strength and Rubber elasticity (300% modulus)

These were measured according to JIS-K-6252. In the measurement of the tear strength, and angle type sample with no cutting was used. For both the tear strength and rubber elasticity (300% modulus), larger value means that the mechanical strength is higher. In the present invention, tear strength is preferably 50 kgf/cm$^2$ or more and rubber elasticity (300% modulus) is preferably 120 kgf/cm$^2$ or more.

(2) Rolling resistance (tan δ) index

A tan δ temperature dispersion curve was obtained by plotting valued measured under the conditions of a frequency of 10 Hz, an initial strain of 10%, a vibration amplitude of ±0.25% and a rise in temperature of 2° C./min according to JIS-K-6394 except using Rheolograph Solid L1R (manufactured by Toyo Seiki) and a sample of 50×5×2 (mm) in length×width×depth. Values of tan δ at 0° C. and 60° C. were obtained from this curve. The values of tan δ in Examples and Comparative Examples are expressed by indices taking the value in Comparative Example 1 as 100. Larger tan δ index at 0° C. means that the wet-skid resistance is larger and a smaller tan δ index at 60° C. means that the rolling resistance is lower, indicating that excellent properties are obtained when used for tires or the like. In the present invention, tan δ (0° C.) index is preferably 105 or more and tan δ (60° C.) index is preferably 90 or less.

TABLE 1

| Composition (wt) | Example | | | | | | | |
|---|---|---|---|---|---|---|---|---|
| | 1 | 2 | 3 | 4 | 5 | 6 | 7 | 8 |
| (A) Kind *1 | A1 | A1 | A1 | A1 | A1 | A1 | A1 | A1 |
| Amount (Part by wt) | 100 | 100 | 100 | 100 | 100 | 100 | 100 | 100 |
| (B) *2 Amount Part by wt) | 78.5 | 78.5 | 78.5 | 78.5 | 78.5 | 78.5 | 78.5 | 78.5 |
| (C) *3 Amount (Part by wt) | 6.4 | 6.4 | 6.4 | 6.4 | 6.4 | 6.4 | 6.4 | 4.5 |
| (D) Kind *4 | D1 | D1 | D1 | D2 | D3 | D1 | D1 | D1 |
| Amount (Part by wt) | 2 | 5 | 10 | 5 | 5 | 10 | 10 | 10 |
| Maximum Temp. during Kneading (°C.) | 150 | 150 | 150 | 150 | 150 | 130 | 160 | 130 |
| Evaluation | | | | | | | | |
| Tear strength (kgf/cm$^2$) | 54 | 55 | 60 | 59 | 56 | 52 | 56 | 55 |
| 300% Modulus *kgf/cm$^2$ | 167 | 177 | 180 | 163 | 143 | 121 | 176 | 123 |
| Tan δ (0°C) | 119 | 120 | 118 | 114 | 107 | 113 | 119 | 116 |
| Tan δ (60° C.) | 84 | 81 | 72 | 84 | 89 | 81 | 72 | 73 |
| Bleed on surface of vulcanized rubber | absent | absent | absent | absent | absent | absent | absent | absent |

TABLE 2

| Composition (wt) | Example 1 | 2 | 3 | 4 | 5 | 6 | 7 |
|---|---|---|---|---|---|---|---|
| (A) Kind *1 | A1 | A1 | A1 | A1 | A1 | A2 | A2 |
| Amount (Part by wt) | 100 | 100 | 100 | 100 | 100 | 100 | 100 |
| (B) *2 Amount Part by wt) | 78.5 | 78.5 | 78.5 | 78.5 | 78.5 | 78.5 | 78.5 |
| (C) *3 Amount (Part by wt) | 6.4 | 6.4 | 6.4 | 6.4 | 6.4 | 6.4 | 6.4 |
| (D) Kind *4 |  | D1 | D1 | D4 | D1 |  | D1 |
| Amount (Part by wt) | 0 | 20 | 30 | 10 | 10 | 0 | 10 |
| Maximum Temp. during Kneading (°C.) | 150 | 130 | 144 | 130 | 115 | 123 | 125 |
| Evaluation |  |  |  |  |  |  |  |
| Tear Strength (kgf/cm$^2$) | 54 | 52 | 47 | 52 | 51 | 28 | 77 |
| 300% Modulus *kgf/cm$^2$) | 123 | 140 | 122 | 147 | 97 | 41 | 46 |
| Tan δ (0λC) | 100 | 125 | 131 | 92 | 105 | 42 | 47 |
| Tan δ (60° C.) | 100 | 66 | 58 | 77 | 79 | 141 | 94 |
| Bleed on surface of vulcanized rubber | absent | present | present | present | absent | absent | present |

What is claimed is:

1. A rubber composition obtainable by kneading a mixture at a maximum temperature between about 120° to about 170° C., said mixture comprising:

100 parts by weight of a solution-polymerized styrene-butadiene rubber having a Mooney viscosity (ML$_{1+4}$ 125° C.) in a range of from about 40 to about 140;

about 5 to about 100 parts by weight of silica;

about 1 to about 15 parts by weight of a silane coupling agent; and about 1 to about 15 parts by weight of a polyalkylene glycol having a weight average molecular weight of about 200 to about 20,000.

2. The rubber composition according to claim 1, said silane coupling agent is at least one selected from the group consisting of the compounds represented by the following formulae (1) and (2):

wherein,

R represents a methyl group or an ethyl group;

a represents an integer of 1 to about 6;

b represents an integer of 1 to about 6; and

Z represents a mercapto group, an epoxy group, a vinyl group or an amino group.

3. The rubber composition according to claim 1, wherein said rubber composition exhibits the combination of properties of:

(1) improved wet-skid resistance;

(2) improved rolling resistance; and (3) improved processability when suitably vulcanized.

4. A process for producing a rubber composition which comprises the steps of:

kneading a mixture comprising:

100 parts by weight of a solution-polymerized styrene-butadiene rubber having a Mooney viscosity (ML$_{1+4}$ 125° C.) in a range of from about 40 to about 140;

about 5 to about 100 parts by weight of silica;

about 1 to about 15 parts by weight of a silane coupling agent; and about 1 to about 15 parts by weight of a polyalkylene glycol having a weight average molecular weight of about 200 to about 20,000, at a temperature in which the maximum temperature during the kneading is between about 120° and about 170° C.

5. A tire tread comprising a vulcanized rubber composition having the combination of properties of:

(1) improved wet-skid resistance;

(2) improved rolling resistance; and (3) improved processability when suitably vulcanized, wherein said rubber composition being obtainable by kneading a mixture at a maximum temperature between about 120° to about 170° C., said mixture comprising:

100 parts by weight of a solution-polymerized styrene-butadiene rubber having a Mooney viscosity (ML$_{1+4}$ 125° C.) in a range of from about 40 to about 140;

about 5 to about 100 parts by weight of silica;

about 1 to about 15 parts by weight of a silane coupling agent; and about 1 to about 15 parts by weight of a polyalkylene glycol having a weight average molecular weight of about 200 to about 20,000.

6. A tire comprising the tire tread according to claim 4.

7. The rubber composition according to claim 1, wherein the Mooney viscosity is in a range of from about 50 to about 120.

8. The process according to claim 4, wherein the Mooney viscosity is in a range of from about 50 to about 120.

9. The tire tread according to claim 5, wherein the Mooney viscosity is in a range of from about 50 to about 120.

* * * * *